United States Patent [19]

Lu

[11] Patent Number: 5,406,933
[45] Date of Patent: Apr. 18, 1995

[54] HIGH EFFICIENCY FUEL-FIRED CONDENSING FURNACE HAVING A COMPACT HEAT EXCHANGER SYSTEM

[75] Inventor: Lin-Tao Lu, Fort Smith, Ark.

[73] Assignee: Rheem Manufacturing Company, New York, N.Y.

[21] Appl. No.: 210,056

[22] Filed: Mar. 16, 1994

Related U.S. Application Data

[63] Continuation-in-part of Ser. No. 95,691, Jul. 21, 1993, Pat. No. 5,322,050.

[51] Int. Cl.⁶ ............................................. F24H 3/02
[52] U.S. Cl. ........................... 126/110 R; 126/116 R
[58] Field of Search ............ 126/110 R, 116 R, 116 B

[56] References Cited

U.S. PATENT DOCUMENTS 4,515,145  5/1985  Tallman et al. ................. 126/110 R
5,097,819  3/1992  Talbert et al. .................. 126/116 R Primary Examiner—Carroll B. Dority
Attorney, Agent, or Firm—Konneker Bush Hitt & Chwang

[57] ABSTRACT

A tubular recuperative heat exchanger structure is mounted in a housing chamber within a fuel-fired condensing furnace in the vertical flow path of supply air being flowed through the housing by a blower. The heat exchanger structure comprises a primary heat exchanger defined by a vertically serpentined series of combustor tubes into open inlet ends of which a series of inshot-type fuel burners flow flames and hot combustion gases, and a secondary heat exchanger formed from a horizontally extending series of finned heat exchanger tubes having inlets in flow communication with the outlets of the combustor tubes and outlets in flow communication with the inlet of a draft inducer fan. The firing rate of the furnace is correlated to the configuration and relative geometries of the primary and secondary heat exchanger tubes in a manner making the overall heat exchanger highly compact and thermally efficient in addition to reducing air blower and draft inducer electrical consumption as well as reducing the operating noise of the furnace.

17 Claims, 3 Drawing Sheets

HIGH EFFICIENCY FUEL-FIRED CONDENSING FURNACE HAVING A COMPACT HEAT EXCHANGER SYSTEM

CROSS-REFERENCE TO RELATED APPLICATION

This application is a continuation-in-part of copending U.S. application Ser. No. 08/095,691, filed on Jul. 21, 1993, now U.S. Pat. No. 5,322,050, and entitled "HIGH EFFICIENCY FUEL-FIRED CONDENSING FURNACE HAVING A COMPACT HEAT EXCHANGER SYSTEM".

BACKGROUND OF THE INVENTION

The present invention generally relates to fuel-fired heating apparatus and, in a preferred embodiment thereof, more particularly relates to heat exchanger systems used in fuel-fired, forced air condensing furnaces.

With the growing need to improve the overall energy efficiency of fuel-fired, forced air heating furnaces, considerable design effort has been directed toward increasing the combustion gas-to-supply air heat transfer capability of their heat exchanger components. Traditionally, fuel-fired furnaces have been designed to extract only sensible heat from the combustion gases generated by their burner systems. This mode of heat transfer is commonly referred to as a "dry" or "non-recuperative" process, and typically provides furnace fuel efficiencies of no more than about 85%.

To capture and utilize otherwise wasted latent combustion gas heat, recuperative or "condensing" type heat exchangers have been used in which a secondary or "wet" heat exchanger is connected in series with the primary or "dry" heat exchanger at its discharge side. During furnace operation, the primary heat exchanger performs its usual task of extracting sensible heat of the combustion gas, and the secondary heat exchanger operates to extract primarily latent heat, thereby considerably lowering the temperature of the combustion gases ultimately discharged to atmosphere, by the operation of a draft inducer fan, via the furnace vent stack.

The use of condensing type primary/secondary heat exchanger systems of this type potentially raises the overall heat exchanger thermal efficiency to about 95% or higher. However, due to the addition of the secondary heat exchanger, the overall size of the high efficiency condensing furnace is correspondingly increased, thereby also undesirably increasing the material cost of the furnace and its outer jacket heat loss. Moreover, the flue gas side and the supply air side pressure drops of the higher efficiency furnace are also increased. This, in turn, usually necessitates the use of a larger draft inducer fan and supply air blower. As a result, the overall noise level and electric power consumption are undesirably increased.

Under conventional practice, gas-fired residential condensing furnaces have typically been provided with "clamshell" type heat exchangers. This type of heat exchanger structure requires a relatively large interior flue gas flow area and its heat transfer rate is relatively low. In order to compensate for this low heat transfer efficiency, the overall size of the typical clamshell heat exchanger tends to be quite large. The large body of the heat exchanger not only increases the overall system cost, but also significantly increases the furnace jacket heat loss due to the large heat flux radiated toward the jacket from the clamshell heat exchanger.

In an attempt to reduce the problems, limitations and disadvantages associated with clamshell heat exchangers, various recuperative heat exchanger designs have utilized serpentined tubular primary heat exchanger sections coupled to condensing secondary heat exchangers. Conventional condensing heat exchanger designs of this type have typically utilized relatively large primary heat exchanger flame tubes (in the range of from 1.75" diameter to 2.5" diameter) due to the belief that smaller diameter tubes unavoidably lead to increased flame quenching by the tube walls, thereby producing reduced efficiency combustion, and that such small diameter flame tubes would generate a highly turbulent internal flame which would lead to unacceptably high combustion noise.

However, when flame tubes in the conventional 1.75"-2.5" diameter range are used in the primary section of a recuperative heat exchanger, the bending radius of the tubes needs to be proportionally increased in order to have a similar manufacturability, thereby leading to an undesirable increase in the heat exchanger system and furnace jacket sizes. Furthermore, due to a relatively low heat transfer rate for these relatively large flame tubes, more surface area is needed to carry out the required heat transfer function. As a result, the size of the tubular heat exchanger system for conventionally designed condensing furnace has tended to be undesirably large.

Also, under conventional heat exchanger design practice, a relatively large number of flame tube passes, typically five to eight, have been used in prior condensing furnaces. Because the flue gas and supply air side pressure drops both increase with the increase tubular passes, the condensing furnace with a tubular heat exchanger system of conventional design typically has a very high inside (flue gas side) and outside (supply air side) pressure resistance and requires a more powerful draft inducer fan and supply air blower. In addition to the increased system cost resulting from this traditional heat exchanger design, the overall noise level of the furnace is increased because the main noise sources in the furnace are fluid moving devices—i.e., the draft inducer fan and the supply air blower.

More importantly, large draft inducer fans and supply air blowers also increase the furnace's electrical power consumption, which is often overlooked in furnace design. According to a recent study, the electrical power consumption of the flow moving devices can be as high as ten percent of the total furnace energy input. Although the electrical power consumption of a furnace is not currently taken into account in determining the overall power efficiency of a furnace, it negatively impacts the furnace operating cost and reduces the operating cost savings advantages otherwise potentially available in enhanced efficiency condensing furnaces.

In view of the foregoing it can be seen that a need exists for a high efficiency fuel-fired condensing furnace, having an improved recuperative heat exchanger, which is more compact, quieter, and has lower flue gas and supply air side pressure losses than conventional condensing furnaces of the type generally described above. It is accordingly an object to provide such a condensing furnace.

SUMMARY OF THE INVENTION

In carrying out principles of the present invention, in accordance with a preferred embodiment thereof, a specially designed recuperative heat exchanger structure is incorporated in a high efficiency fuel-fired condensing furnace. The furnace comprises a housing having an inlet opening and an outlet opening, and blower means operable to flow air sequentially into the inlet opening, through a vertical flow path within the housing, and then outwardly through the outlet opening. Burner means are provided for receiving a fuel-air mixture from a source thereof and discharging flames and hot combustion gases. Draft inducer fan means, having an inlet and outlet, are also provided and are operative to receive and discharge combustion gases generated during operation of the furnace.

The recuperative heat exchanger structure is operatively interposed in the vertical air path within the housing and includes a primary heat exchanger and a secondary heat exchanger. The primary heat exchanger is defined by a horizontally spaced series of vertically serpentined metal combustor tubes having inlet ends positioned to receive flames and hot combustion gases discharged from the burner means, and outlet ends for discharging the received combustion gases. The secondary heat exchanger is disposed beneath the primary heat exchanger, within a heat exchanger chamber portion of the housing, and includes a spaced series of finned metal condensing heat exchanger tubes having inlet ends in flow communication with the outlet ends of the combustor tubes, and outlet ends in flow communication with the draft inducer fan means inlet.

During furnace operation flames and hot combustion gases generated by the burner means are drawn into the inlet ends of the serpentined combustor tubes, and the hot combustion gases are sequentially drawn through the primary and secondary heat exchanger tubes, and then discharged to an external vent stack, by the draft inducer fan means. At the same time the blower means force return air from the conditioned space served by the furnace upwardly and externally across the recuperative neat exchanger structure thereby causing combustion heat to be transferred from the recuperative heat exchanger structure to the air. The heated air is then flowed back to the conditioned space.

In the preferred embodiment of the furnace a unique combination of six heat exchanger design features cooperate to provide the recuperative heat exchanger structure with a heat transfer efficiency of at least 90 percent, while at the same time making the heat exchanger considerably smaller than recuperative heat exchangers of conventional design. Additionally, the furnace in which the specially designed recuperative heat exchanger structure is incorporated is provided with a significantly reduced operating noise level, and the electrical consumption of both the blower and draft inducer means are substantially lessened. The six heat exchanger design features which cooperate to provide these structural and operational improvements in the preferred embodiment of the condensing furnace are as follows:

1. Each of the serpentined combustor tubes has an outside diameter within the range of from $1\frac{1}{4}''$ to $1\frac{1}{2}''$. This design parameter is directly contrary to conventional design wisdom which has traditionally dictated that the outside diameters of serpentined primary heat exchanger tubes be within the diameter range of from $1\frac{3}{4}''$ to $2\frac{1}{2}''$ for the purposes of providing clean combustion and operational noise reduction.

2. Each of the combustor tubes has a first length greater than about ten times the inner diameter of the tube. This design parameter facilitates the combustion process within the combustor tubes and the burning out of excessive CO formed at the upstream ends of the combustor tubes.

3. The firing rate of the burner means is correlated to the cross-sectional area of the combustor tubes in a manner such that combustion gas flowing through the combustor tubes has a transitional-to-slightly turbulent flow characteristic, thereby substantially enhancing the heat transfer process without generating excessive combustion noise levels. This is preferably achieved by maintaining the burner means firing rate per unit inner cross-sectional area of the combustor tube combustion passages within the range of from about 9,000 Btu/Hr/In$^2$ to about 13,000 Btu/Hr/In$^2$.

4. The total combustion gas flow passes through the overall recuperative heat exchanger structure is less than five as compared to the five to eight total flow passes traditionally thought to be necessary under conventional tubular recuperative heat exchanger design practice. Preferably, there are three combustion gas flow passes through the primary heat exchanger and a single combustion gas flow pass through the secondary heat exchanger.

5. The combustion gas pressure loss through the overall recuperative heat exchanger structure is further reduced by maintaining the ratio of the total inner tube cross-sectional area between the primary and secondary heat exchangers within the range of from about 1.5 to about 3.0. This yields a good pressure loss balance between the primary and secondary heat exchangers, and also yields a reduced overall pressure loss for the overall heat exchanger system.

6. The ratio of the height of the primary heat exchanger to that of the housing chamber within which the overall recuperative heat exchanger structure is disposed is within the range of from about 0.45 to about 0.60. Preferably, this ratio is approximately 0.50. This ratio provides a good outside air distribution between the primary and secondary heat exchangers and substantially improves the air side heat transfer of the recuperative heat exchanger structure.

Of these six design features, the first two are considered to be of primary importance in achieving the structural and operational advantages of the condensing furnace of the present invention, with the other four contributing to a somewhat lesser extent to achieving such advantages. While the incorporation of all six of these design features into the furnace is preferred, it will be readily appreciated that various combinations of only some such features will also provide the furnace with both structural and operational improvements compared to condensing furnaces having recuperative heat exchangers of conventional design incorporated therein.

DETAILED DESCRIPTION

Figure 1:
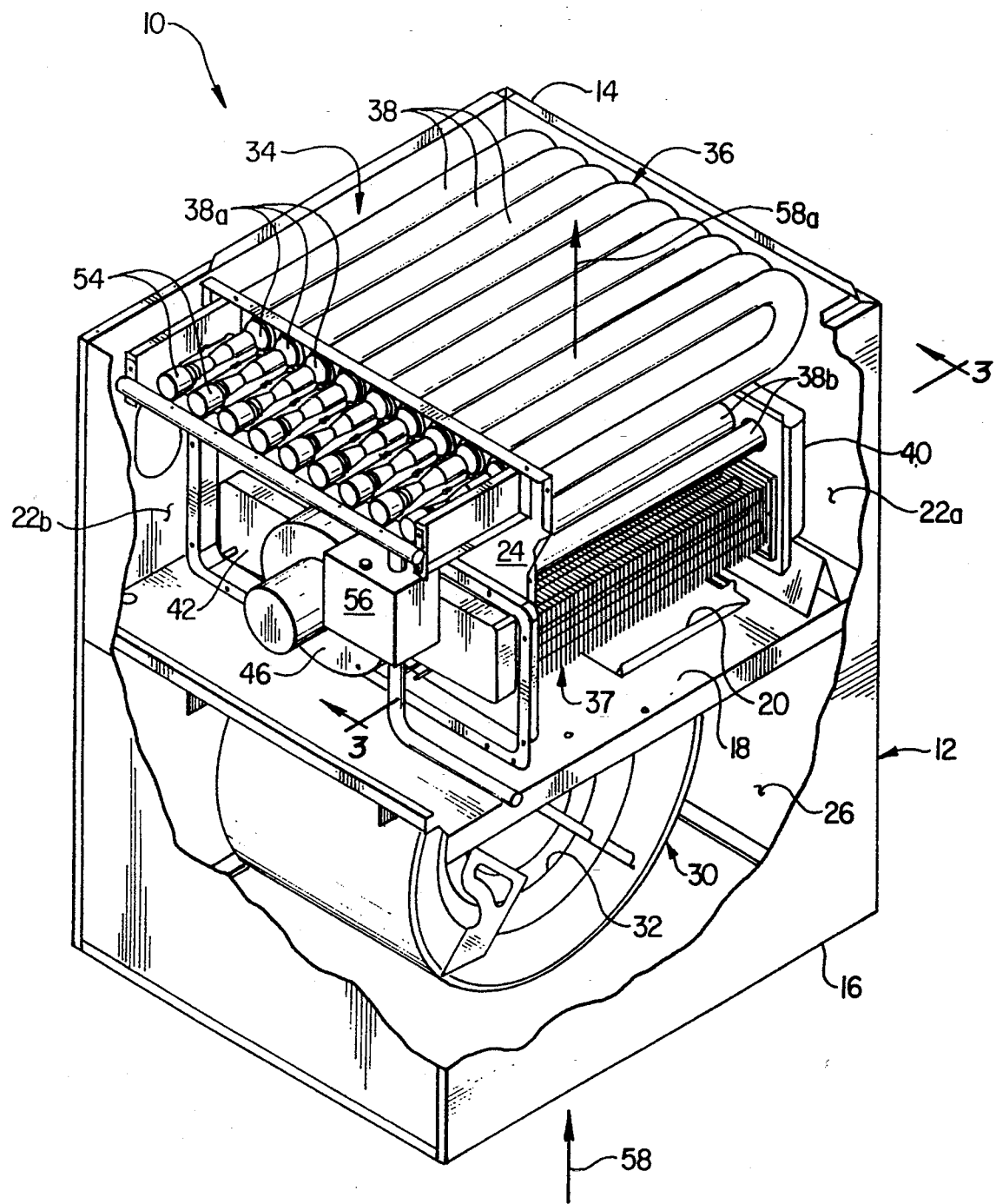
FIG. 1 is a partially cut away perspective view of a representative fuel-fired forced air condensing furnace incorporating therein a specially designed compact heat exchanger system embodying principles of the present invention.
Figure 2:
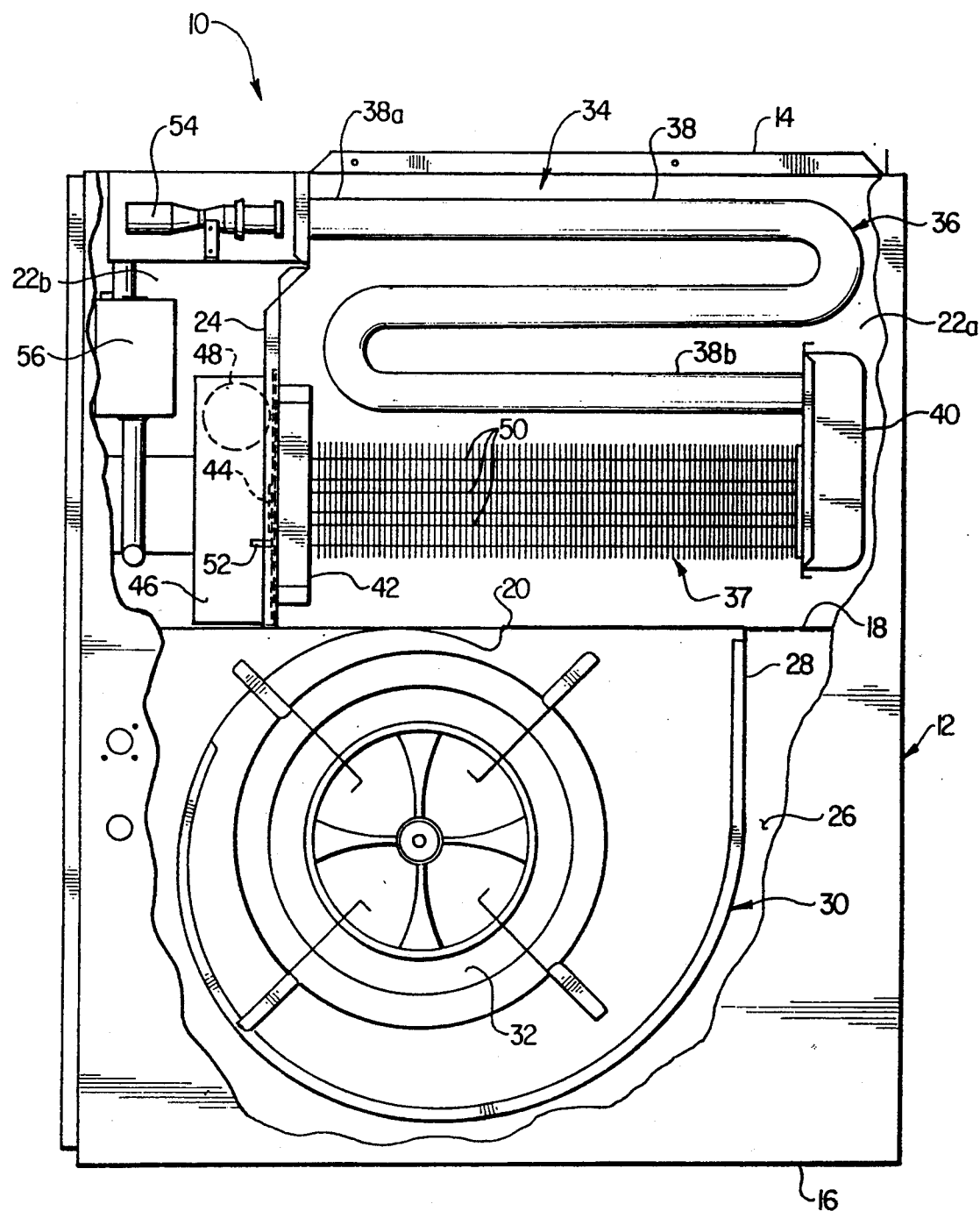
FIG. 2 is an enlarged scale, partially cut away right side elevational view of the condensing furnace.

Illustrated in FIGS. 1 and 2 is a representative high efficiency fuel-fired condensing furnace 10 which embodies principles of the present invention. Furnace 10 is representatively of an upflow configuration and includes a generally rectangularly cross-sectioned metal jacket or housing 12 having open upper and lower ends 14,16 to which supply and return air ductwork (not shown) may be operatively connected. A horizontal panel 18, having a rectangular opening 20 therein, vertically divides the interior of the housing 12 into an upper chamber 22 divided into subchambers 22a,22b by an interior vertical panel 24, and a lower chamber 26. Chamber 22a overlies the panel opening 20. The outlet 28 of a supply air blower 30 having an inlet opening 32 is operatively connected to the panel opening 20.

Figure 3:
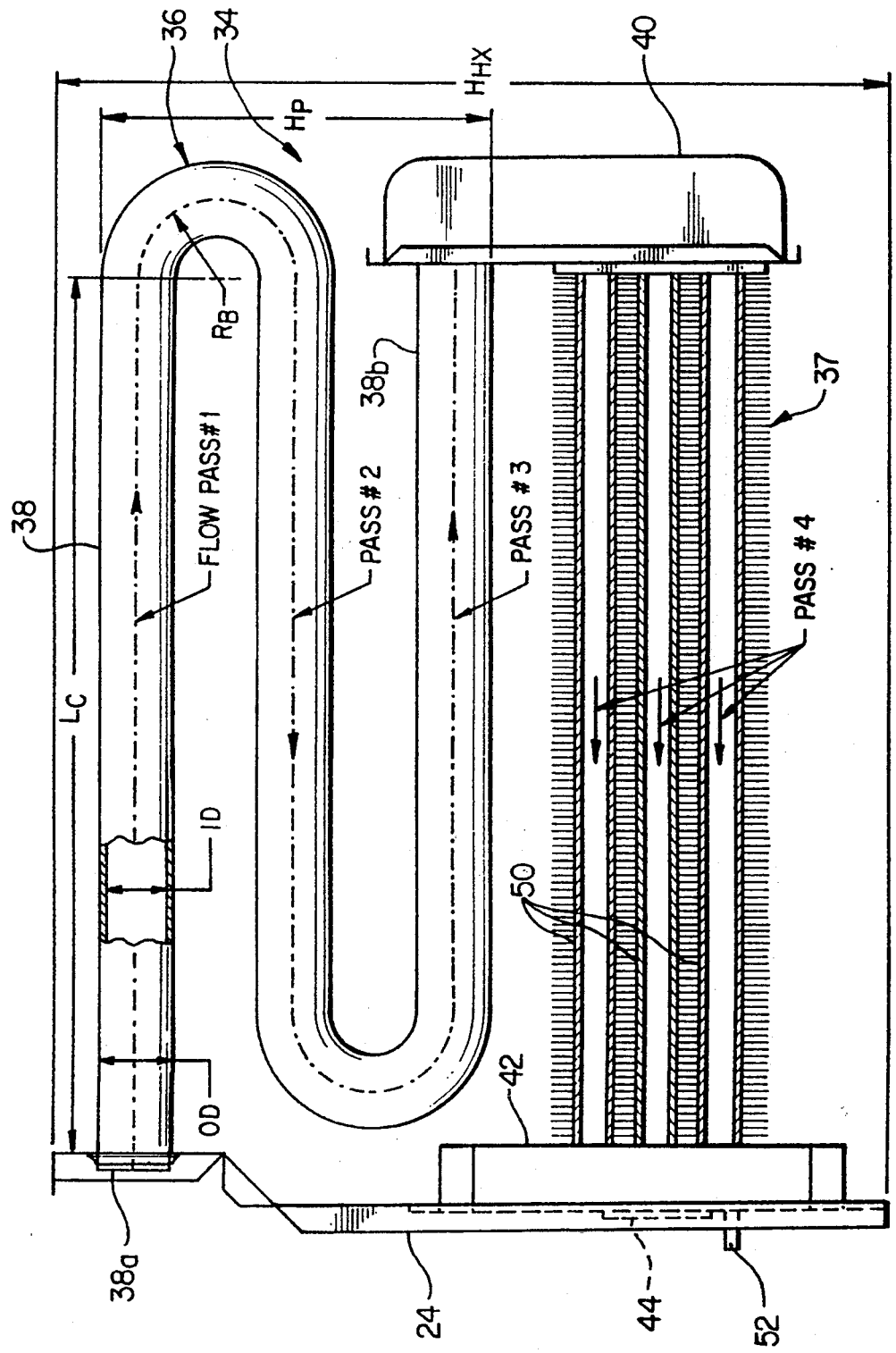
FIG. 3 is an enlarged scale partly elevational cross-sectional view through the compact heat exchanger portion of the furnace taken along line 3—3 of FIG. 1.

A specially designed recuperative heat exchanger 34, embodying principles of the present invention, is operatively mounted in the upper subchamber 22a and includes (as also shown in FIG. 3) an upper primary section 36 and a lower secondary or condensing section 37 interposed between the section 36 and the horizontal housing panel 18. Primary heat exchanger section 36 is formed from a horizontally spaced plurality of vertically serpentined metal combustor tubes 38 having leftwardly facing open inlet ends 38a connected to the vertical housing panel 24, and rightwardly facing open outlet ends 38b connected to corresponding inlet openings formed in a metal collector box 40 positioned in a lower right portion of the upper housing subchamber 22a.

Mounted on the vertical panel 24, in a generally horizontally facing relationship with the collector box 40 is a collector box 42 having an outlet 44 connected to the inlet of a draft inducer fan 46 disposed within the upper housing subchamber 22b. Draft inducer fan 46 has an outlet 48 (see FIG. 2) connectable to an exterior vent stack (not illustrated). As best illustrated in FIG. 3, the secondary heat exchanger section 37 includes a spaced series of horizontally extending finned metal heat exchanger tubes 50 having their right or inlet ends connected to the collector box 40, and their left or outlet ends connected to the collector box 42. Collector box 42 is provided with a suitable drain outlet fitting 52 which may be connected to a suitable drain conduit (not shown) for carrying away condensate generated within the secondary heat exchanger section during furnace operation.

Supported within the upper housing subchamber 22b are a series of inshot-type fuel burners 54 suitably supplied with gaseous fuel through a gas valve 56. As illustrated, the burners 54 are aligned with the open inlet ends 38a of the combustor tubes 38, and are operative during firing of the furnace 10 to flow flames and hot combustion products into the tube inlet ends 38a.

During operation of the furnace 10 the burners 54 flow flames and resulting hot combustion gases into the open tube ends 38a, with the received combustion gases being drawn sequentially through the serpentined primary combustor tubes 38, the collector box 40, the finned secondary heat exchanger tubes 50, and the collector box 42. Combustion products entering the draft inducer fan 46 from the collector box 42 are discharged from the fan 46 into the previously mentioned exterior vent stack.

At the same time, the blower 30 draws return air 58 (FIG. 1) from the conditioned space served by the furnace 10 upwardly through the bottom housing opening 16 into the lower housing chamber 26. Air 58 entering the chamber 26 enters the blower inlet 32 and is forced upwardly through the panel opening 20 and then externally across the heat exchanger structure 34. As it exteriorly traverses the heat exchanger structure 34 the air 58 receives combustion heat from the heat exchanger structure and upwardly exits it as heated supply air 58a for delivery to the conditioned space served by the furnace 10.

By virtue of a combination of several unique design features incorporated therein, the recuperative heat exchanger structure 34 is considerably smaller and more efficient than conventionally designed recuperative heat exchangers having the same heating capacity, and the furnace 10 in which the heat exchanger structure is installed is quieter, and uses less electrical energy than condensing furnaces of conventional design. The unique design features that provide the furnace 10 with such advantages are set forth below.

HEAT EXCHANGER DESIGN FEATURES

Compared to the flame tubes used in the tubular primary section of a conventional recuperative heat exchanger, the outside diameter of the tubes 38 is considerably smaller. Specifically, the outside diameter OD of the tubes 38 (see FIG. 3) is in the size range of from $1\frac{1}{8}''$ to $1\frac{1}{2}''$ as compared to the $1\frac{3}{4}''$ to $2\frac{1}{2}''$ outside diameter flame tubes of conventionally configured primary heat exchanger sections. This substantial diameter reduction proportionally reduces the tube bending radius $R_B$ of the primary heat exchanger portion. More importantly, the heat transfer of the primary section is significantly enhanced by using these smaller flame tubes. This is because the smaller tubes in a cross-flow tend to have a better flow distribution which, in turn, increases the overall heat transfer coefficient of the tubes. Additionally, because the ratio of the heat transfer surface area to cross-sectional area for the reduced diameter tubes is increased the smaller tubes are provided with a higher heat transfer rate at an equivalent pressure loss level.

The heat transfer capacity of the primary heat exchanger section is further enhanced under the present invention by correlating the firing rate of the furnace to the flame tube size in a manner such that the firing rate per unit inner cross-sectional area of the flame tubes 38 is within the range of from about 9,000 to 13,000 Btu/Hr/In$^2$. Importantly, this changes the internal flue gas flow characteristic within the tubes 38 from an otherwise laminar flow (as is the case in the considerably larger flame tubes used in conventional heat exchanger design) to a transitional-to-slightly turbulent flow condition. This enhances the combustion heat transfer process within the primary heat exchanger section without negatively affecting the combustion noise level thereof.

The combustion characteristics of the primary heat exchanger section are enhanced by making the length $L_C$ of the first straight tubular portion (i.e., the "combustion" portion) of each flame tube 38 more than about ten times its inner diameter ID. This provides a sufficient initial tube length to accommodate the combustion and to burn out any excessive CO formed at the upstream end portion of each tube 38.

As illustrated in FIG. 3, three flow passes are utilized in the primary heat exchanger section 36, and a single pass is used in the secondary or condensing section 37. Accordingly, in the illustrated preferred embodiment of the overall recuperative heat exchanger structure 34, the total number of flow passes is only four (compared to the five to eight passes typically used in conventional heat exchanger designs). Due to this substantial reduction in the total number of flow passes, the flue gas and supply air side pressure losses in the heat exchanger structure 34 are significantly reduced. This not only reduces the operating noise of the heat exchanger to a substantial extent, but also significantly reduces the electrical power consumption of the supply air blower 30 and the draft inducer fan 46 during furnace operation.

The flue gas side pressure loss is further reduced by sizing the total cross-sectional area of the primary heat exchanger section 36 relative to that of the secondary heat exchanger section 37 in a manner such that the ratio of the total inner tube cross-sectional area of the primary to secondary heat exchangers is in the range of from about 1.5 to about 3.0. This yields an improved pressure loss balance between the primary and secondary heat exchanger sections and also substantially reduces the overall internal pressure loss of the heat exchanger system.

Additionally, the ratio of the height $H_P$ of the primary heat exchanger 36 (FIG. 3) to the height of the upper housing subchamber 22a (see FIG. 2) is within the range of from about 0.45 to about 0.60, and is preferably approximately 0.5. This design feature yields a good outside air distribution between the primary and second heat exchanger sections 36,37 for an effective air side heat transfer rate.

Of the six design features set forth above, the specified flame tube diameter range and the ratio of the inner tube diameter ID to the flame tube first pass length $L_C$ are considered to be of primary importance in achieving the various above-mentioned efficiency and size reduction improvements in the furnace 10. The other design features also play significant roles in achieving such improvements. Accordingly, in the preferred embodiment of the present invention all six design features are preferably incorporated in the furnace 10 to maximize its advantages over condensing furnace using conventionally designed recuperative heat exchangers therein.

The foregoing detailed description is to be clearly understood as being given by way of illustration and example only, the spirit and scope of the present invention being limited solely by the appended claims.

What is claimed is:

1. A fuel-fired condensing furnace comprising:
a housing having an inlet opening and an outlet opening;
blower means operable to flow air sequentially into said inlet opening, through a vertical flow path within said housing, and then outwardly through said outlet opening;
burner means for receiving a fuel-air mixture and discharging flames and hot products of combustion;
draft inducer fan means having an inlet and being operative to receive and discharge combustion gases generated during operation of said furnace; and
a recuperative heat exchanger structure operatively interposed in said vertical flow path within Said housing and including:
   (a) a primary heat exchanger defined by a horizontally spaced series of vertically serpentined metal combustor tubes having inlet ends positioned to receive flames and hot products of combustion discharged from said burner means, and outlet ends for discharging combustion gases, and
   (b) a separate secondary heat exchanger disposed beneath said primary heat exchanger and including a spaced series of single pass heat exchanger tubes having inlet ends in flow communication with said outlet ends of said combustor tubes, and outlet ends in flow communication with said draft inducer fan means inlet,
   each of said combustor tubes having an outer diameter within the range of from $1\frac{1}{8}''$ to $1\frac{1}{2}''$, and
   each of said combustor tubes having a first pass length greater than about ten times the inner diameter thereof.

2. The fuel-fired condensing furnace of claim 1 wherein:
said burner means have a firing rate correlated to the total cross-sectional area of said combustor tubes in a manner such that during operation of said furnace the combustion gas flow through said combustor tubes has a generally transitional-to-slightly turbulent flow characteristic.

3. The fuel-fired condensing furnace of claim 2 wherein:
the firing rate of said burner means per unit inner cross-sectional area of said combustor tubes is within the range of from about 9,000 Btu/Hr/In$^2$ to about 13,000 Btu/Hr/In$^2$.

4. The fuel-fired condensing furnace of claim 1 wherein:
the total number of combustion gas flow passes through said combustor and heat exchanger tubes is less than five.

5. The fuel-fired condensing furnace of claim 4 wherein:
the total number of combustion gas flow passes through said combustor tubes is three.

6. The fuel-fired condensing furnace of claim 1 wherein:
the ratio of the total tube cross-sectional area of said combustor tubes to the total tube inner cross-sectional area of said heat exchanger tubes is in the range of from about 1.5 to about 3.0.

7. The fuel-fired condensing furnace of claim 1 wherein:
said housing has a chamber therein within which said recuperative heat exchanger structure is disposed, said chamber having a height parallel to said vertical flow path,
said primary heat exchanger has a height parallel to said vertical flow path, and
the ratio of said height of said primary heat exchanger to said height of said chamber is within the range of from about 0.45 to about 0.60.

8. The fuel-fired condensing furnace of claim 7 wherein:
said ratio of said height of said primary heat exchanger to said height of said chamber is approximately 0.5.

9. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path within said housing and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a separate secondary heat exchanger disposed beneath said primary heat exchanger and including a spaced series of single pass heat exchanger tubes having inlet ends in flow communication with said outlet ends of said combustor tubes, and outlet ends in flow communication with said draft inducer fan means inlet, said burner means having a firing rate correlated to the total cross-sectional area of said combustor tubes in a manner such that during operation of said furnace the combustion gas flow through said combustor tubes has a generally transitional-to-slightly turbulent flow characteristic, the total number of combustion gas flow passes through said combustor and heat exchanger tubes being less than five, and the ratio of the total tube inner cross-sectional area of said combustor tubes to the total tube cross-sectional area of said heat exchanger tubes is in the range of from about 1.5 to about 3.0.

10. The fuel-fired condensing furnace of claim 9 wherein:

the firing rate of said burner means per unit inner cross-sectional area of said combustor tubes is within the range of from about 9,000 Btu/Hr/In$^2$ to about 13,000 Btu/Hr/In$^2$.

11. The fuel-fired condensing furnace of claim 9 wherein:

the total number of combustion gas flow passes through said combustor tubes is three.

12. The fuel-fired condensing furnace of claim 9 wherein:

said housing has a chamber therein within which said recuperative heat exchanger structure is disposed, said chamber having a height parallel to said vertical flow path, said primary heat exchanger has a height parallel to said vertical flow path, and the ratio of said height of said primary heat exchanger to said height of said chamber is within the range of from about 0.45 to about 0.60.

13. The fuel-fired condensing furnace of claim 12 wherein:

said ratio of said height of said primary heat exchanger to said height of said chamber is approximately 0.5.

14. A fuel-fired condensing furnace comprising:

a housing having an inlet opening and an outlet opening;

blower means operable to flow air sequentially into said inlet opening, through a vertical flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said vertical flow path within said housing and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, and (b) a secondary heat exchanger disposed beneath said primary heat exchanger and including a spaced series of heat exchanger tubes having inlet ends in flow communication with said outlet ends of said combustor tubes, and outlet ends in flow communication with said draft inducer fan means inlet, each of said combustor tubes having an outer diameter within the range of from $1\frac{1}{8}''$ to $1\frac{1}{2}''$, each of said combustor tubes having a first pass length greater than about ten times the inner diameter thereof, said burner means having a firing rate correlated to the total inner cross-sectional area of said combustor tubes in a manner such that during operation of said furnace the combustion gas flow through said combustor tubes has a generally transitional-to-slightly turbulent flow characteristic, the total number of combustion gas flow passes through said combustor and heat exchanger tubes being less than five, the ratio of the total tube inner cross-sectional area of said combustor tubes to the total tube cross-sectional area of said heat exchanger tubes being in the range of from about 1.5 to about 3.0, and said housing having a chamber therein within which said recuperative heat exchanger structure is disposed, said chamber having a height parallel to said vertical flow path, said primary heat exchanger having a height parallel to said vertical flow path, and the ratio of said height of said primary heat exchanger to said height of said chamber is within the range of from about 0.45 to about 0.60.

15. The fuel-fired condensing furnace of claim 14 wherein:

the firing rate of said burner means per unit inner cross-sectional area of said combustor tubes is within the range of from about 9,000 Btu/Hr/In$^2$ to about 13,000 Btu/Hr/In$^2$.

16. The fuel-fired condensing furnace of claim 14 wherein:
the total number of combustion gas flow passes through said combustor tubes is three, and
the total number of combustion gas flow passes through said heat exchanger tubes is one.

17. The fuel-fired condensing furnace of claim 14 wherein:
said ratio of said height of said primary heat exchanger to said height of said chamber is approximately 0.5.

* * * * *